(12) United States Patent
Ramzanali et al.

(10) Patent No.: US 8,913,999 B1
(45) Date of Patent: Dec. 16, 2014

(54) METHOD AND SYSTEM FOR IDENTIFYING GEOLOCATIONALLY RELEVANT CONTACTS AND ACQUIRING THEIR CONTACT DATA

(71) Applicant: Intuit Inc., Mountain View, CA (US)

(72) Inventors: Asad Ramzanali, Mountain View, CA (US); Dheeraj Sanka, San Francisco, CA (US); Adam Kane Sanders, San Francisco, CA (US); Kabir Nadir Daya, Dallas, TX (US)

(73) Assignee: Intuit Inc., Mountain View, CA (US)

( * ) Notice: Subject to any disclaimer, the term of this patent is extended or adjusted under 35 U.S.C. 154(b) by 22 days.

(21) Appl. No.: 13/778,679

(22) Filed: Feb. 27, 2013

(51) Int. Cl.
*H04M 3/42* (2006.01)
*H04W 4/02* (2009.01)
*H04L 29/08* (2006.01)

(52) U.S. Cl.
CPC ........... *H04W 4/02* (2013.01); *H04L 29/08108* (2013.01); *H04W 4/021* (2013.01); *H04W 4/022* (2013.01); *H04W 4/025* (2013.01)
USPC .................. 455/414.1; 455/414.2; 455/456.1; 455/456.5; 455/456.3; 455/457

(58) Field of Classification Search
CPC ....... H04W 4/02; H04W 4/021; H04W 4/022; H04W 4/025; H04L 29/08108
USPC .......... 455/414.1, 414.2, 456.1, 456.3, 456.5, 455/457
See application file for complete search history.

(56) References Cited

U.S. PATENT DOCUMENTS

| | | | |
|---|---|---|---|
| 2008/0102856 A1* | 5/2008 | Fortescue et al. | 455/456.1 |
| 2010/0240381 A1* | 9/2010 | Yamada et al. | 455/450 |
| 2012/0220314 A1* | 8/2012 | Altman et al. | 455/456.3 |
| 2013/0316743 A1* | 11/2013 | Emigh et al. | 455/457 |
| 2014/0081879 A1* | 3/2014 | Olson et al. | 705/319 |
| 2014/0207959 A1* | 7/2014 | Kamali et al. | 709/227 |

* cited by examiner

*Primary Examiner* — Khai M Nguyen
(74) *Attorney, Agent, or Firm* — Hawley Troxell Ennis & Hawley LLP; Philip McKay

(57) ABSTRACT

First party geolocation data is obtained along with data indicating one or more contact parties associated with the first party. A relevant contact party radius from the geolocation of the first party is defined such that any contact parties within the relevant contact party radius are considered relevant contact parties with respect to the first party. Contact party geolocation data indicating the geolocation of at least one of the contact parties is then obtained. The first party geolocation data and the contact party geolocation data is then analyzed to identify any relevant contact parties within the relevant contact party radius. When a relevant contact party is identified, contact data for the identified relevant contact party is obtained and/or accessed and provided to one or more applications associated with the first party computing system.

39 Claims, 4 Drawing Sheets

METHOD AND SYSTEM FOR IDENTIFYING GEOLOCATIONALLY RELEVANT CONTACTS AND ACQUIRING THEIR CONTACT DATA

BACKGROUND OF THE INVENTION

One popular feature now offered by many computing systems, and particularly mobile computing systems, is Point-to-Point data transfer.

Using Point-to-Point data transfer applications a first party can use a first party computing system to transfer funds/payments; image data; video data; audio data; text data; calendar data, and numerous other forms of data to one or more other, or "second", parties' computing systems, and/or network locations.

While incredibly convenient, Point-to-Point data transfer applications have a significant drawback in that in order to affect a data transfer from a first party to a second "contact" party, the first party must identify and designate the second party to the Point-to-Point data transfer application and provide contact data for the second party to the Point-to-Point data transfer application, typically a phone number, e-mail address, account data, or other contact data associated with the second party's computing system or accounts.

Currently, the first party designates the second party and provides contact data for the second party by one of two methods. If the second party is a new "contact" party, the first party must typically manually enter data indicating the identification of the second party and the second party's contact data into the Point-to-Point data transfer application through the first party computing system. This is often a difficult and time consuming task, particularly when the first party computing system is a mobile computing system with a typically limited screen and data entry capability.

In other cases, where the second party is a "known" contact entity, the second party's contact data may already exist and be accessible by the first party computing system and/or the Point-to-Point data transfer application. However, even in these cases, the first party must still identify the second party, typically via data entry in the form of manual character entry of data indicating the second party's identification, or, at best, by selecting the second party's identification from a pull down menu or listing. Again, this can be a difficult and time consuming task, particularly when the first party computing system is a mobile computing system with a typically limited screen and data entry capability.

In a mobile computing system dominated world, one of the most important goals is to minimize, or eliminate, manual data entry and to "auto-fill" as much required data as possible without requiring significant manual user data entry. As discussed above, currently available data transfer applications fail to meet this goal by requiring the first party to largely manually enter a second party's contact data in order to affect a data transfer. Consequently, currently available data transfer applications are not ideally optimized for today's computing environment.

What is needed is a method and system that allows a second party to be identified without significant data entry and for contact data associated with the identified second party to be obtained and provided to an application on a first party computing system with little or no manual first party data entry.

SUMMARY OF THE INVENTION

In accordance with one embodiment, a method and system for identifying geolocationally relevant contacts and acquiring their contact data includes obtaining first party geolocation data indicating a geolocation of a first party. In one embodiment, the first party geolocation data is obtained. Data indicating one or more contact parties associated with the first party is then obtained.

In one embodiment, a relevant contact party radius or area is defined such that any contact parties of the one or more contact parties associated with the first party within the relevant contact party radius or radius are considered potential relevant contact parties with respect to the first party.

In one embodiment, contact party geolocation data indicating the geolocation of at least one of the contact parties of the one or more contact parties associated with the first party is obtained. The first party geolocation data and the contact party geolocation data are then analyzed to identify any contact parties within the relevant contact party radius. In one embodiment, any contact parties within the relevant contact party radius are then designated relevant contact parties.

In one embodiment, when a relevant contact party is identified, contact data for the identified relevant contact party is obtained and/or accessed. In one embodiment, the contact data for the identified relevant contact party is then provided to one or more applications associated with the first party computing system.

Figure 1:
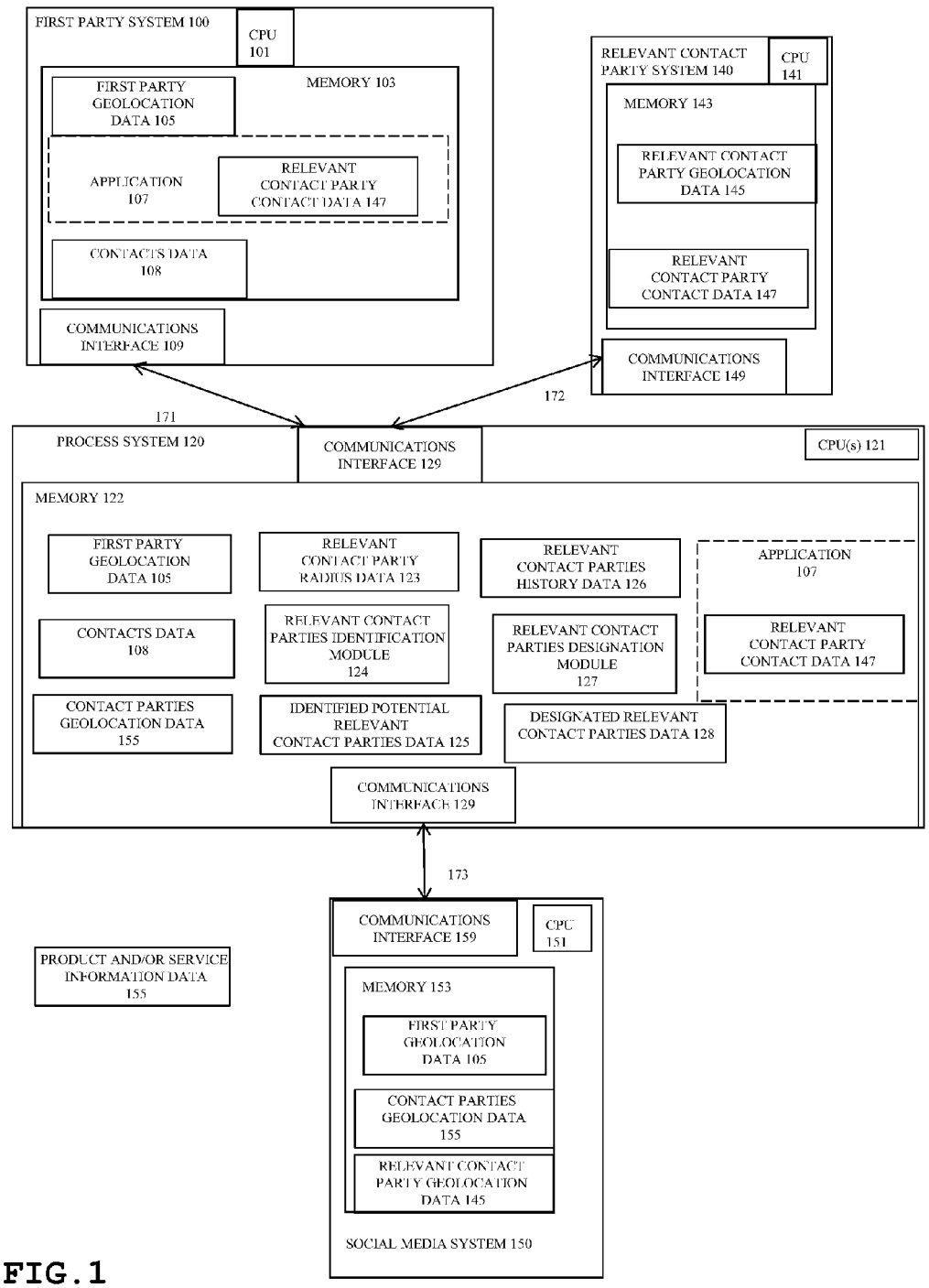
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for identifying geolocationally relevant contacts and acquiring their contact data includes a process for identifying geolocationally relevant contacts and acquiring their contact data implemented by one or more processors associated with one or more computing systems.

As used herein, the term "computing system", includes, but is not limited to, a desktop computing system; a portable computing system; a mobile computing system; a laptop computing system; a notebook computing system; a tablet computing system; a workstation; a server computing system; a mobile phone; a smart phone; a wireless telephone; a two-way pager; a Personal Digital Assistant (PDA); a media player, i.e., an MP3 player and/or other music and/or video player; an Internet appliance; or any device that includes components that can execute all, or part, of any one of the processes and/or operations as described herein.

In addition, as used herein, the term computing system, can denote, but is not limited to, systems made up of multiple desktop computing systems; portable computing systems; mobile computing systems; laptop computing systems; notebook computing systems; tablet computing systems; workstations; server computing systems; smart phones; wireless telephones; two-way pagers; Personal Digital Assistants (PDAs); media players; Internet appliances; or any devices that can be used to perform the processes and/or operations as described herein.

In one embodiment, one or more computing systems are connected by one or more communications channels, such as, but not limited to, any general network, communications network, or general network/communications network system; a cellular network; a wireless network; a combination of different network types; a public network; a private network; a satellite network; a POTS network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a POTS network; any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

In one embodiment, process for identifying geolocationally relevant contacts and acquiring their contact data is implemented by one or more processors associated with one or more mobile computing systems.

Herein, the terms "mobile computing system" and "mobile device" are used interchangeably and include, but are not limited to: a portable computer; a two-way pager; a cellular telephone; a smart phone; a tablet computing system; a notebook computing system; a digital wireless telephone; a Personal Digital Assistant (PDA); a media player, i.e., an MP3 player and/or other music and/or video player; an Internet appliance; or any other mobile device and/or computing system that includes components that can execute all, or part, of any one of the processes and/or operations as described herein.

In addition, as used herein, the term mobile computing system and/or mobile device, can denote, but is not limited to, computing systems made up of multiple: wireless devices; cellular telephones; smart phones; digital telephones; two-way pagers; PDAs; tablet computing systems; notebook computing systems; media players; or any desired combination of these devices and/or computing systems, that are coupled to perform the processes and/or operations as described herein.

In some embodiments, one or more mobile computing systems are connected by one or more mobile communication networks such as, but not limited to, any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

In one embodiment, process for identifying geolocationally relevant contacts and acquiring their contact data includes obtaining first party geolocation data indicating a geolocation of a first party.

In one embodiment, the first party geolocation data is obtained from a first party computing system associated with the first party, such as, but not limited to, data obtained via a Global Positioning Satellite (GPS) system and/or a GPS capability provided with the first party computing system.

In various embodiments, the first party geolocation data is obtained and/or determined based on analysis of a communication signal used and/or emitted by the first party computing system, such as, but not limited to, a first party mobile computing system and/or the relay stations used by the first party computing system.

In various embodiments, the first party geolocation data is obtained from the first party computing system itself via one or more data links.

In various embodiments, the first party geolocation data is obtained and/or determined based on data from a WiFi connection used by the first party computing system.

In various embodiments, the first party geolocation data is obtained and/or determined based on data from a connection used by the first party computing system provided by "Bluetooth™."

In one embodiment, the first party geolocation data is obtained from a social media system used by the first party and social media "geotagging".

In one embodiment, the first party geolocation data is obtained from a social media system used by the first party and active posting on the social media system.

Herein, social media systems, social media websites, and social media networks, regardless of distribution and access means, are collectively referred to as "social media systems". Herein, social media systems include, but are not limited to, computing system implemented networks, systems, and sites that allow users to provide content, often in the form of posts, about themselves and to track and view posts from selected other users of the social media system.

Specific examples of currently available social media systems include social media systems such as, but not limited to, those offered through Facebook™; Twitter™; Linkedin™; Bebo™; Classmates.com™; Foursquare™; MySpace™; and many other post, blogging, and user content provided, websites/networks as discussed herein, and/or as known in the art at the time of filing, and/or as developed after the time of filing.

A popular feature associated with social media systems is the "user location update" feature whereby a user can inform their friends/follows of their location thru semi-automatically, or automatically, generated posts indicating the user's location and/or the business associated with that location. A specific illustrative example of a user location update feature is the "check-in" feature currently provided within the social media system offered by Facebook™.

The user location update feature has proven popular and useful not only to let a user's friends know where the user is located, but also to learn if the user's friends are nearby at the same time. One of the key attributes that has contributed to the popularity and usefulness of the user location update feature is the minimal user data input required and the semi-automatic, or automatic, aspect of the user location update feature that allows the user to post their location without the need to enter any text, or provide significant other user input.

In various embodiments, the first party geolocation data is determined and/or provided by any method, means, mechanism, or procedure for determining a position of a computing system as discussed herein, and/or as known in the art at the time of filing, and/or as developed after the time of filing.

Numerous means, methods, systems, algorithms, procedures, and processes are known in the art for obtaining location data associated with a computing system. Consequently, a more detailed discussion of any particular means, method, system, algorithm, procedure, and/or process, for obtaining location data associated with a computing system is omitted here to avoid detracting from the invention.

In one embodiment, data indicating one or more contact parties associated with the first party is obtained from one or more sources.

In one embodiment, data indicating one or more contact parties associated with the first party is obtained from a contacts list associated an application implemented by the first party computing system.

In one embodiment, data indicating one or more contact parties associated with the first party is obtained from a social media system used by the first party and the contact parties associated with the first party.

In one embodiment, a relevant contact party radius is defined. In one embodiment, the relevant contact party radius represents a distance, such as a defined number of feet, yards, meters, etc., from the geolocation of the first party. In one embodiment, the relevant contact party radius is defined such that any contact parties of the one or more contact parties associated with the first party determined to be within the relevant contact party radius are considered potential relevant contact parties with respect to the first party.

In one embodiment, a relevant contact party area is defined such that any contact parties of the one or more contact parties associated with the first party determined to be within the relevant contact party area are considered potential relevant contact parties with respect to the first party.

In one embodiment, contact party geolocation data indicating the geolocation of at least one of the contact parties of the one or more contact parties associated with the first party is obtained.

In one embodiment, the contact party geolocation data is obtained from various contact parties' computing systems associated with the contact parties, such as, but not limited to, data obtained via a Global Positioning Satellite (GPS) system and/or a GPS capability provided with the contact parties' computing systems.

In various embodiments, the contact party geolocation data is obtained and/or determined based on analysis of a communication signal used and/or emitted by the contact parties' computing systems, such as, but not limited to, a contact party's mobile computing system and/or the relay stations used by a contact party's computing system.

In various embodiments, the contact party geolocation data is obtained from the contact parties' computing systems themselves via one or more data links.

In various embodiments, the contact party geolocation data is obtained and/or determined based on data from a WiFi connection used by the contact parties' computing systems.

In various embodiments, the contact party geolocation data is obtained and/or determined based on data from a "Bluetooth™" connection used by the contact parties' computing systems.

In one embodiment, the contact party geolocation data is obtained from a social media system used by the contact parties' and social media "geotagging".

In one embodiment, the contact party geolocation data is obtained from a social media system used by the contact parties' and active posting on the social media system.

In one embodiment, the first party geolocation data, the contact party geolocation data, and data representing the relevant contact party radius is analyzed using one or more processors associated with one or more computing systems to identify any relevant contact parties within the relevant contact party radius.

In one embodiment, a relevant contact party is identified not only based on the contact party being within the relevant contact party radius but also based on the first party's history of selecting the contact party as a relevant contact party.

In one embodiment, a relevant contact party is identified not only based on the contact party being within the relevant contact party radius but also based on the first party's history of selecting the contact party as a relevant contact party within a specific application currently being accessed and/or implementing/using the process for identifying geolocationally relevant contacts and acquiring their contact data.

In one embodiment, a relevant contact party is identified as the closest contact party to the first party, regardless of distance from the first party, or the area where the contact party is located.

In one embodiment, when a relevant contact party within the relevant contact party radius is identified, contact data for the identified relevant contact party is obtained.

In various embodiments, the contact data for the identified relevant contact party includes, but is not limited to, data, such as, but not limited to, the relevant contact party's full name, the relevant contact party's e-mail address, the relevant contact party's phone number, the relevant contact party's account number, a webpage address associated with the relevant contact party, the relevant contact party's social media account and access data, and/or any other contact, or other data, associated with the relevant contact party.

In one embodiment, the contact data for the identified relevant contact party is obtained from data already in the first party computing system, such as data contained in a contacts list of an application implemented on the first party computing system.

In one embodiment, the contact data for the identified relevant contact party is obtained from a contact party computing system via a data link or a third party computing system.

In one embodiment, the contact data for the identified relevant contact party is obtained from a social media system.

In one embodiment, the contact data for the identified relevant contact party is obtained from a database.

As used herein, the term "database" includes, but is not limited to, any data storage mechanism known at the time of filing, or as developed thereafter, such as, but not limited to, a hard drive or memory; a designated server system or computing system, or a designated portion of one or more server systems or computing systems; a server system network; a distributed database; or an external and/or portable hard drive. Herein, the term "database" can refer to a dedicated mass storage device implemented in software, hardware, or a combination of hardware and software. Herein, the term "database" can refer to an on-line function. Herein, the term "database" can refer to any data storage means that is part of, or under the control of, any computing system, as discussed herein, known at the time of filing, or as developed thereafter.

In one embodiment, the contact data for the identified relevant contact party is obtained from any source of contact data, as discussed herein, and/or as known in the art at the time of filing, and/or as developed after the time of filing.

In one embodiment, once obtained, the contact data for the identified relevant contact party is provided to one or more applications associated with the first party computing system. In one embodiment, once obtained, the contact data for the identified relevant contact party is provided to one or more Point-to-Point data transfer applications such as, but not limited to, a Point-to-Point payment application; a Point-to-Point image data transfer application; a Point-to-Point video data transfer application; a Point-to-Point audio data transfer application; a Point-to-Point text data transfer application; a Point-to-Point webpage data transfer application; and/or any other Point-to-Point data transfer application as discussed herein, and/or as known in the art at the time of filing, and/or as developed after the time of filing.

In one embodiment, the contact data for the identified relevant contact party provided to the one or more applications associated with the first party computing system is used to "auto-fill" one or more data fields in the one or more applications, thereby reducing required data input.

Using the method and system for identifying geolocationally relevant contacts and acquiring their contact data discussed herein, a first party's geolocation is determined and a second, or relevant, contact party is identified based on the their proximity to the first party. The contact data for the identified relevant contact party is then obtained and provided to a data transfer application without any significant first party data entry. Consequently using the method and system for identifying geolocationally relevant contacts and acquiring their contact data discussed herein, applications can automatically obtain relevant contact party identification and contact data and use the relevant contact party identification and contact data to auto-fill one or more data entry fields within the applications.

Hardware System Architecture

FIG. 1 is a block diagram of an exemplary hardware architecture for implementing one embodiment of a process for identifying geolocationally relevant contacts and acquiring their contact data, such as exemplary process 300 (FIG. 3) discussed herein.

FIG. 1 includes first party system 100, e.g., a computing system accessible by a first party; relevant contact party system 140, e.g., a computing system associated with a contact party designated a relevant contact party; process system 120, e.g., a computing system associated with a provider of a process for identifying geolocationally relevant contacts and acquiring their contact data; a social media system 150, e.g., a computing system associated with a social media network or system; and communication channels 171, 172, and 173.

As seen in FIG. 1, first party system 100 includes Central Processing Unit (CPU) 101, memory 103, and communication interface 109. In various embodiments, first party system 100 can be any computing system discussed herein, and/or as known in the art at the time of filing, and/or as developed after the time of filing.

As seen in FIG. 1, in one embodiment, memory 103 includes first party geolocation data 105. In various embodiments, first party geolocation data 105 includes data obtained via a Global Positioning Satellite (GPS) system and/or a GPS capability provided with first party system 100 (not shown).

In various embodiments, first party geolocation data 105 is provided to process system 120.

In one embodiment, memory 103 includes all, or part, of application 107. In various embodiments, application 107 is any application implemented by first party system 100. In various embodiments, application 107 is a Point-to-Point data transfer application such as, but not limited to, a Point-to-Point payment application; a Point-to-Point image data transfer application; a Point-to-Point video data transfer application; a Point-to-Point audio data transfer application; a Point-to-Point text data transfer application; a Point-to-Point webpage data transfer application; and/or any other Point-to-Point data transfer application as discussed herein, and/or as known in the art at the time of filing, and/or as developed after the time of filing.

In one embodiment, memory 103 includes all, or part, of contacts data 108. In one embodiment, contacts data 108 is data indicating one or more contact parties associated with the first party obtained from one or more sources.

In one embodiment, contacts data 108 indicating one or more contact parties associated with the first party is obtained from a contacts list associated with an application implemented by first party system 100.

In one embodiment, contacts data 108 indicating one or more contact parties associated with the first party is obtained from social media system 150 used by the first party and the contact parties associated with the first party.

In one embodiment, memory 103 includes all, or part, of relevant contact party contact data 147. As discussed below, in one embodiment, relevant contact party contact data 147 is part of an application implemented, at least in part, on first party system 100. In other embodiments, relevant contact party contact data 147 is received from process system 120.

In various embodiments, first party system 100 may further include standard user interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, a computing system, whether available or known at the time of filing or as later developed.

While a single first party system, first party system 100, is shown in FIG. 1, those of skill in the art will readily recognize that first party system 100 is representative of any number of first party systems. Consequently, in various embodiments, there can be more than the single first party system 100 shown in FIG. 1.

As seen in FIG. 1, relevant contact party system 140 includes processor/Central Processing Unit (CPU) 141, memory 143, and communication interface 149. In various embodiments, relevant contact party system 140 can be any computing system discussed herein, and/or as known in the art at the time of filing, and/or as developed after the time of filing.

As seen in FIG. 1, memory 143 includes relevant contact party geolocation data 145. As discussed below, in one embodiment, relevant contact party geolocation data 145 includes data indicating a geolocation of a contact party designated a relevant contact party by relevant contact party designation module 127 of process system 120. As also discussed below, in one embodiment, relevant contact party geolocation data 145 is part of contact parties' geolocation data 155.

In one embodiment, contact parties' geolocation data 155 is data indicating the geolocation of at least one of the contact parties of the one or more contact parties of contacts data 108 associated with the first party.

In one embodiment, memory 143 includes all, or part, of relevant contact party contact data 147. As discussed below, in one embodiment, relevant contact party contact data 147 is provided to process system 120.

In various embodiments, relevant contact party system 140 may further include standard user interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, a computing system, whether available or known at the time of filing or as later developed.

While a single relevant contact party system, relevant contact party system 140, is shown in FIG. 1, those of skill in the art will readily recognize that relevant contact party system 140 is representative of any number of contact party systems. Consequently, in various embodiments, there can be more than the single relevant contact party system 140 shown in FIG. 1.

Also shown in FIG. 1 is social media system 150. As seen in FIG. 1, social media system 150 includes CPU 151, memory 153, and communications interface 159.

In various embodiments, social media system 150 can be any computing system discussed herein, and/or as known in the art at the time of filing, and/or as developed after the time of filing capable of providing/hosting a social media network.

Herein, social media systems, social media websites, and social media networks, regardless of distribution and access means, are collectively referred to as "social media systems". Herein, social media systems include, but are not limited to, computing system implemented networks, systems, and sites that allow users to provide content, often in the form of posts, about themselves and to track and view posts from selected other users of the social media system.

Specific examples of currently available social media systems include social media systems such as, but not limited to, those offered through Facebook™; Twitter™; Linkedin™; Bebo™; Classmates.com™; Foursquare™; MySpace™; and many other post, blogging, and user content provided, websites/networks as discussed herein, and/or as known in the art at the time of filing, and/or as developed after the time of filing.

A popular feature associated with social media systems is the "user location update" feature whereby a user can inform their friends/follows of their location thru semi-automatically, or automatically, generated posts indicating the user's location and/or the business associated with that location. A specific illustrative example of a user location update feature is the "check-in" feature currently provided within the social media system offered by Facebook™.

The user location update feature has proven popular and useful not only to let a user's friends know where the user is located, but also to learn if the user's friends are nearby at the same time. One of the key attributes that has contributed to the popularity and usefulness of the user location update feature is the minimal user data input required and the semi-automatic, or automatic, aspect of the user location update feature that allows the user to post their location without the need to enter any text, or provide significant other user input.

As seen in FIG. 1, in one embodiment, memory 153 includes all, or part, of first party geolocation data 105. As seen in FIG. 1, in one embodiment, memory 153 includes all, or part, of contact parties' geolocation data 155. As seen in FIG. 1, in one embodiment, memory 153 includes all, or part, of relevant contact party geolocation data 145.

As seen in FIG. 1, process system 120 includes CPUs 121, memory 122, and communications interface 129.

Process system 120 can be any computing system as discussed herein, and/or as known in the art at the time of filing, and/or as developed thereafter, that includes components that can execute all, or part, of a process for identifying geolocationally relevant contacts and acquiring their contact data in accordance with at least one of the embodiments as described herein.

In one embodiment, memory 122 includes all, or part, of first party geolocation data 105.

In various embodiments, first party geolocation data 105 is obtained by process system 120 from first party system 100.

In various embodiments, first party geolocation data 105 is obtained and/or determined by process system 120 based on analysis of a communication signal used and/or emitted by first party system 100, such as, but not limited to, a first party mobile computing system and/or the relay stations used by the first party computing system.

In various embodiments, first party geolocation data 105 is obtained by process system 120 from first party system 100 itself via one or more data links.

In various embodiments, first party geolocation data 105 is obtained and/or determined by process system 120 based on data from a WiFi connection used by first party system 100.

In various embodiments, first party geolocation data 105 is obtained and/or determined by process system 120 based on data from a connection used by first party system 100 provided by "Bluetooth™."

In various embodiments, first party geolocation data 105 is obtained and/or determined by process system 120 from a social media system, such as social media system 150, used by the first party and social media "geotagging".

In various embodiments, first party geolocation data 105 is obtained and/or determined by process system 120 from a social media system, such as social media system 150, used by the first party and active posting on the social media system.

In one embodiment, memory 122 includes all, or part, of contacts data 108 as received in one embodiment from first party system 100.

In one embodiment, memory 122 includes all, or part, of contact parties geolocation data 155. In one embodiment, contact parties' geolocation data 155 is obtained from various contact parties' computing systems, such as relevant contact party system 140, associated with the contact parties, such as, but not limited to, data obtained via a Global Positioning Satellite (GPS) system and/or a GPS capability provided with the contact parties' computing systems.

In various embodiments, contact parties' geolocation data 155 is obtained and/or determined based on analysis of a communication signal used and/or emitted by the contact parties' computing systems, such as, but not limited to, a contact party's mobile computing system and/or the relay stations used by a contact party's computing system, such as relevant contact party system 140.

In various embodiments, contact parties' geolocation data 155 is obtained from the contact parties' computing systems, such as relevant contact party system 140, themselves via one or more data links.

In various embodiments, contact parties' geolocation data 155 is obtained and/or determined based on data from a WiFi connection used by the contact parties' computing systems, such as relevant contact party system 140.

In various embodiments, contact parties' geolocation data 155 is obtained and/or determined based on data from a "Bluetooth™" connection used by the contact parties' computing systems, such as relevant contact party system 140.

In one embodiment, contact parties' geolocation data 155 is obtained from a social media system, such as social media system 150, used by the contact parties' and social media "geotagging".

In one embodiment, contact parties' geolocation data 155 is obtained from a social media system, such as social media system 150, used by the contact parties' and active posting on the social media system.

In one embodiment, memory 122 includes all, or part, of relevant contact party radius data 123. In one embodiment, relevant contact party radius data 123 represents a distance, such as a defined number of feet, yards, meters, etc., from the geolocation of the first party indicated in first party geolocation data 105. In one embodiment, relevant contact party radius data 123 is defined such that any contact parties of the one or more contact parties associated with the first party of contacts data 108 determined to be within the relevant contact party radius are considered potential relevant contact parties with respect to the first party.

In one embodiment, memory 122 includes all, or part, of relevant contact parties identification module 124. In one embodiment, relevant contact parties identification module 124 analyzes first party geolocation data 105, contacts data 108, contact parties geolocation data 155, and relevant contact party radius data 123 to transform at least part of first party geolocation data 105, contacts data 108, contact parties geolocation data 155, and relevant contact party radius data 123 into identified potential relevant contact parties data 125 by identifying any contact parties of contacts data 108 within the relevant contact party radius of relevant contact party radius data 123 as potential relevant contact parties with respect to the first party.

In one embodiment, memory 122 includes all, or part, of relevant contact parties designation module 127. In one embodiment, relevant contact parties designation module 127 uses relevant contact parties history data 126 to transform at least part of identified potential relevant contact parties data 125 into designated relevant contact parties data 128.

In one embodiment, relevant contact party contact data 147 is obtained for each relevant contact party of designated relevant contact party data 128.

In various embodiments, relevant contact party contact data 147 includes, but is not limited to, data, such as, but not limited to, the relevant contact party's full name, the relevant contact party's e-mail address, the relevant contact party's phone number, the relevant contact party's account number, a webpage address associated with the relevant contact party, the relevant contact party's social media account and access data, and/or any other contact, or other data, associated with the relevant contact party.

In one embodiment, relevant contact party contact data 147 is obtained from data already in the first party system 100, such as data contained in a contacts list data 108 on first party system 100.

In one embodiment, relevant contact party contact data 147 is obtained from a contact party computing system, such as relevant contact party system 140, via a data link or a third party computing system.

In one embodiment, relevant contact party contact data 147 is obtained from social media system 150.

In one embodiment, relevant contact party contact data 147 is obtained from a database.

In one embodiment, relevant contact party contact data 147 is obtained from any source of contact data, as discussed herein, and/or as known in the art at the time of filing, and/or as developed after the time of filing.

In one embodiment, once obtained, relevant contact party contact data 147 is provided to one or more applications associated with the first party computing system, such as application 107.

In one embodiment, relevant contact party contact data 147 is used to "auto-fill" one or more data fields in application 107, thereby reducing required data input.

Process system 120 may further include standard user interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, a computing system, whether available or known at the time of filing or as later developed.

In one embodiment, any, or all, of communications channels 171, 172, and 173 can be, but are not limited to: any network; a mobile communication link, such as a mobile phone link; a land-line phone link; a cable-based communications channel; a satellite communications channel; the Internet, a cloud, or other network communications channel; and/or any other communications channel, or combination of communications channels, as discussed herein, and/or as known in the art at the time of filing, and/or as developed after the time of filing.

In one embodiment, first party system 100, relevant contact party system 140, social media system 150, and/or process system 120, are part of a cloud computing environment.

Those of skill in the art will readily recognize that the components shown in FIG. 1, and their respective sub-components, are shown for illustrative purposes only and that architectures with more or fewer components can implement, and benefit from, the invention. In addition, the particular type of, and configuration of, first party system 100, relevant contact party system 140, social media system 150, and/or process system 120 are not relevant.

In various embodiments, the elements shown in FIG. 1 are grouped into one or more processes, or sub-processes, used to implement all, or part of, a process for identifying geolocationally relevant contacts and acquiring their contact data, such as exemplary process 300 (FIG. 3) discussed herein.

Figure 2A:
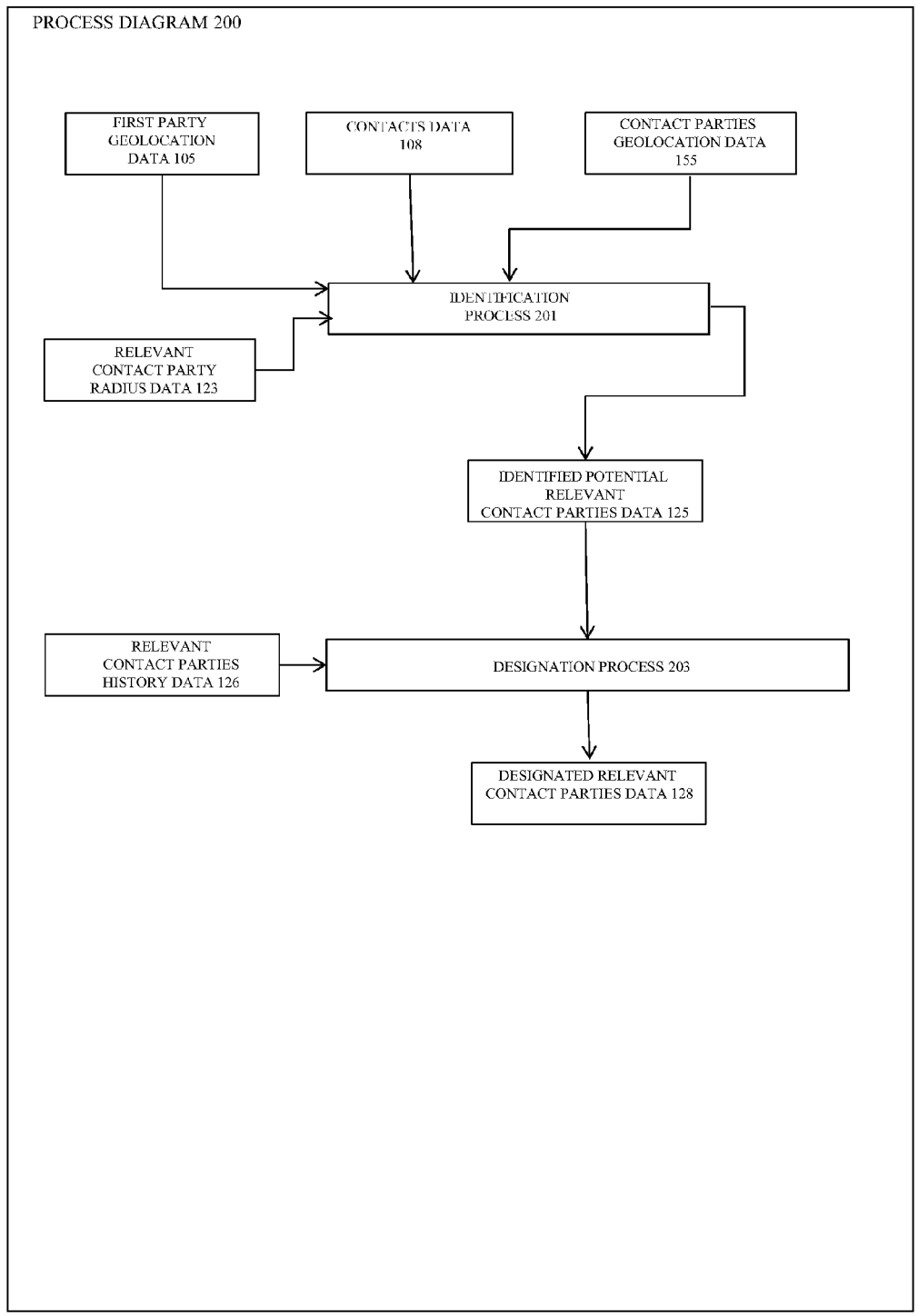
FIG. 2A is a process diagram of part of a process for identifying geolocationally relevant contacts and acquiring their contact data in accordance with one embodiment.

FIG. 2A is a process diagram showing one illustrative example of the interaction of various illustrative processes, or sub-processes, 201 and 203, used to implement all, or part of, a process for identifying geolocationally relevant contacts and acquiring their contact data, such as exemplary process 300 (FIG. 3) discussed herein.

Figure 2B:
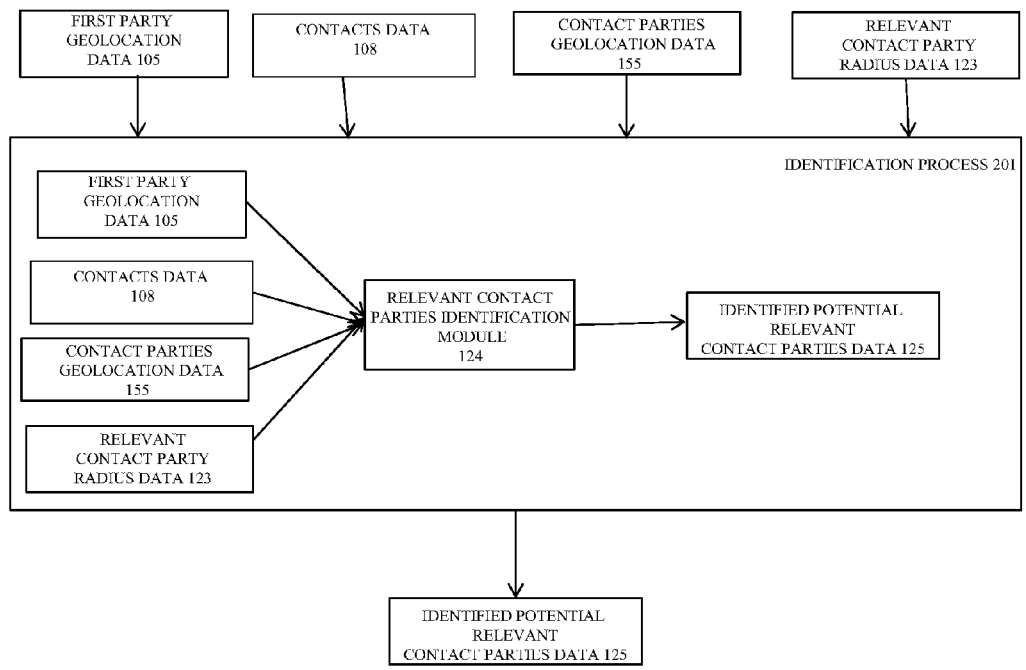
FIG. 2B shows an identification process in accordance with one embodiment.
Figure 2C:
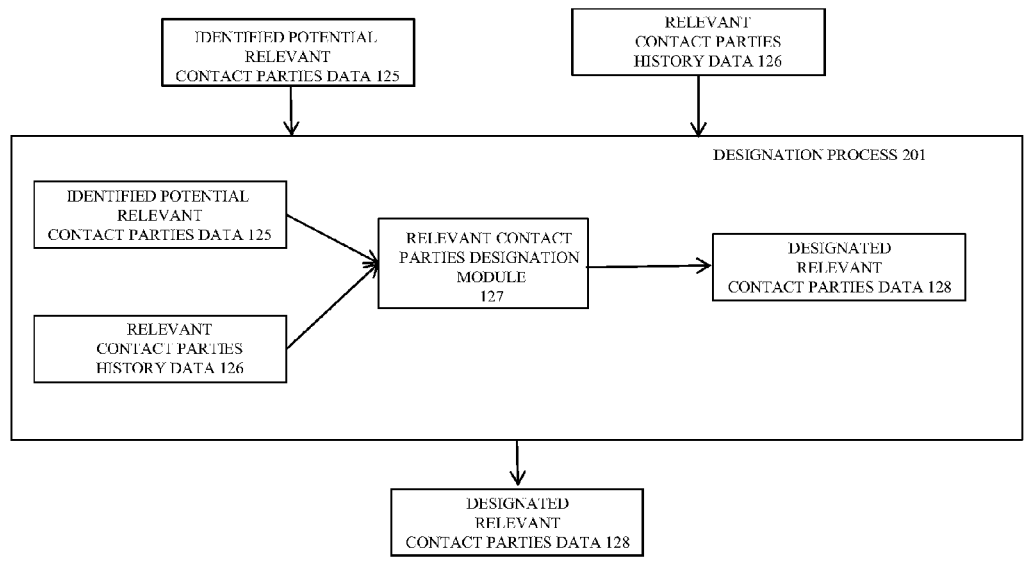
FIG. 2C shows an designation process in accordance with one embodiment.

FIGS. 2B and 2C show illustrative examples of processes 201 and 203 in accordance with one embodiment.

Referring to FIG. 1, FIG. 2A, FIG. 2B, and FIG. 2C together, first party geolocation data 105, contacts data 108, contact parties' geolocation data 155, and relevant contact party radius data 123 are provided to identification process 201 which generates identified potential relevant contact parties data 125. FIG. 2B shows identification process 201 in more detail.

As seen in FIG. 2B, first party geolocation data 105, contacts data 108, contact parties geolocation data 155, and relevant contact party radius data 123 are provided as input data to relevant contact parties identification module 124.

In one embodiment, relevant contact parties identification module 124 analyzes first party geolocation data 105, contacts data 108, contact parties geolocation data 155, and relevant contact party radius data 123 to transform at least part of first party geolocation data 105, contacts data 108, contact parties geolocation data 155, and relevant contact party radius data 123 into identified potential relevant contact parties data 125 by identifying any contact parties of contacts data 108 within the relevant contact party radius of relevant contact party radius data 123 as potential relevant contact parties with respect to the first party.

Referring back to FIG. 1, FIG. 2A, FIG. 2B, and FIG. 2C together, identified potential relevant contact parties data 125 and relevant contact parties history data 126 are provided to designation process 203 which generates designated relevant contact parties data 128. FIG. 2C shows designation process 203 in more detail.

As seen in FIG. 2C, identified potential relevant contact parties data 125 and relevant contact parties history data 126 are used as input data to relevant contact parties designation module 127 which transforms at least part of identified potential relevant contact parties data 125 and relevant contact parties history data 126 into designated relevant contact parties data 128.

In one embodiment, relevant contact parties designation module 127 transforms at least part of identified potential relevant contact parties data 125 and relevant contact parties history data 126 into designated relevant contact parties data 128 based on the contact party being within the relevant contact party radius, e.g., based solely on the fact the contact party is included in identified potential relevant contact parties data 125.

In one embodiment, relevant contact parties designation module 127 transforms at least part of identified potential relevant contact parties data 125 and relevant contact parties history data 126 into designated relevant contact parties data 128 not only based on the contact party being within the relevant contact party radius but also based on the first party's history of selecting the contact party as a relevant contact party as, indicated by relevant contact parties history data 126.

In one embodiment, relevant contact parties designation module 127 transforms at least part of identified potential relevant contact parties data 125 and relevant contact parties history data 126 into designated relevant contact parties data 128 not only based on the contact party being within the relevant contact party radius but also based on the first party's history of selecting the contact party as a relevant contact party within a specific application, e.g., application 107, currently being accessed and/or implementing/using the process for identifying geolocationally relevant contacts and acquiring their contact data.

A noted above, and discussed below, relevant contact party contact data 147 is obtained for each relevant contact party of designated relevant contact party data 128.

In one embodiment, once obtained, relevant contact party contact data 147 is provided to one or more applications associated with the first party computing system, such as application 107.

In one embodiment, relevant contact party contact data 147 is used to "auto-fill" one or more data fields in application 107, thereby reducing required data input.

In the discussion above, certain aspects of one embodiment include processes, sub-processes, steps, operations and/or instructions described herein for illustrative purposes in a particular order and/or grouping. However, the particular order and/or grouping shown and discussed herein are illustrative only and not limiting. Those of skill in the art will recognize that other orders and/or grouping of the processes, sub-processes, steps, operations and/or instructions are possible and, in some embodiments, one or more of the processes, sub-processes, steps, operations and/or instructions discussed above can be combined and/or deleted. In addition, portions of one or more of the processes, sub-processes, steps, operations and/or instructions can be re-grouped as portions of one or more other of processes, sub-processes, steps, operations and/or instructions discussed herein. Consequently, the particular order and/or grouping of the processes, sub-processes, steps, operations and/or instructions discussed herein do not limit the scope of the invention as claimed below.

Process

In accordance with one embodiment, a process for identifying geolocationally relevant contacts and acquiring their contact data includes obtaining first party geolocation data indicating a geolocation of a first party. In one embodiment, the first party geolocation data is obtained from a first party computing system associated with the first party, such as, but not limited to, GPS data associated with the first party's mobile phone.

In one embodiment, data indicating one or more contact parties associated with the first party is then obtained from one or more sources such as, but not limited to, a contacts list associated an application implemented by the first party computing system and/or a social media system used by the first party.

In one embodiment, a relevant contact party radius representing a distance, such as a defined number of feet, from the geolocation of the first party is defined such that any contact parties of the one or more contact parties associated with the first party within the relevant contact party radius are considered a potential relevant contact parties with respect to the first party.

In one embodiment, contact party geolocation data indicating the geolocation of at least one of the contact parties of the one or more contact parties associated with the first party is obtained from one or more sources such as, but not limited to, GPS data associated with the contact parties' mobile phones and geolocation data. In one embodiment, the first party geolocation data, the contact party geolocation data, and data representing the relevant contact party radius is analyzed to identify any relevant contact parties within the relevant contact party radius.

In one embodiment, when a relevant contact party within the relevant contact party radius is identified, contact data for the identified relevant contact party, such as full name, e-mail, phone number, account number, webpage address, etc., is obtained and/or accessed. In one embodiment, the contact data for the identified relevant contact party is then provided to one or more applications associated with the first party computing system such as, but not limited to, a Point-to-Point data transfer application, for use in auto-filling one or more data entry fields required by the one or more applications associated with the first party computing system.

Figure 3:
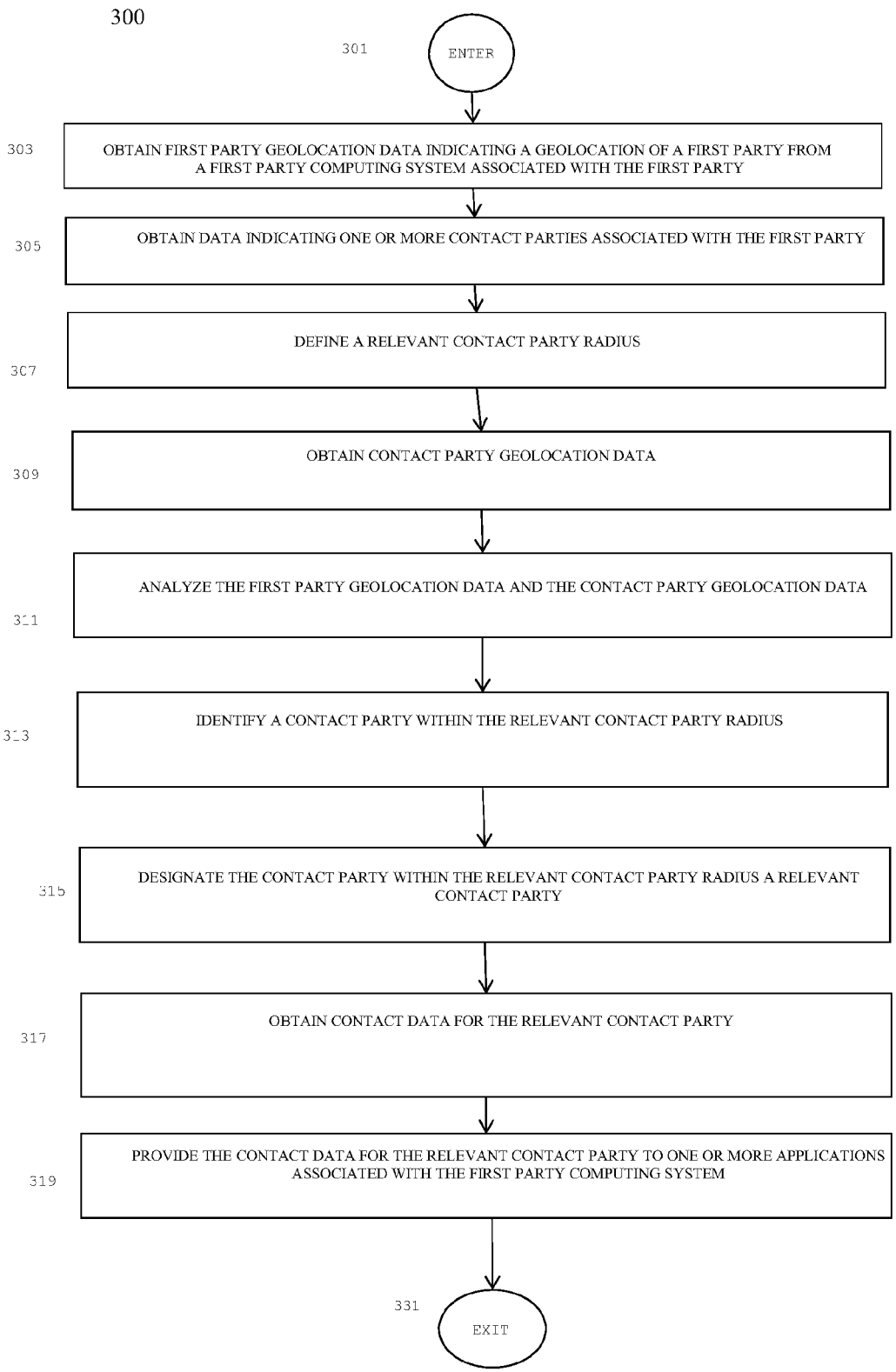
FIG. 3 is a flow chart depicting one example of a process for identifying geolocationally relevant contacts and acquiring their contact data in accordance with one embodiment.

FIG. 3 a flow chart depicting a process 300 for identifying geolocationally relevant contacts and acquiring their contact data in accordance with one embodiment.

Process 300 for identifying geolocationally relevant contacts and acquiring their contact data begins at ENTER OPERATION 301 of FIG. 3 and process flow proceeds to OBTAIN FIRST PARTY GEOLOCATION DATA INDICATING A GEOLOCATION OF A FIRST PARTY FROM A FIRST PARTY COMPUTING SYSTEM ASSOCIATED WITH THE FIRST PARTY OPERATION 303.

In one embodiment, at OBTAIN FIRST PARTY GEOLOCATION DATA INDICATING A GEOLOCATION OF A FIRST PARTY FROM A FIRST PARTY COMPUTING SYSTEM ASSOCIATED WITH THE FIRST PARTY OPERATION 303 first party geolocation data indicating a geolocation of a first party is obtained.

In one embodiment, the first party geolocation data is obtained at OBTAIN FIRST PARTY GEOLOCATION DATA INDICATING A GEOLOCATION OF A FIRST PARTY FROM A FIRST PARTY COMPUTING SYSTEM ASSOCIATED WITH THE FIRST PARTY OPERATION 303 from a first party computing system associated with the first party, such as, but not limited to, data obtained via a Global Positioning Satellite (GPS) system and/or a GPS capability provided with the first party computing system.

In various embodiments, the first party geolocation data is obtained and/or determined at OBTAIN FIRST PARTY GEOLOCATION DATA INDICATING A GEOLOCATION OF A FIRST PARTY FROM A FIRST PARTY COMPUTING SYSTEM ASSOCIATED WITH THE FIRST PARTY OPERATION 303 based on analysis of a communication signal used and/or emitted by the first party computing system, such as, but not limited to, a first party mobile computing system and/or the relay stations used by the first party computing system.

In various embodiments, the first party geolocation data is obtained at OBTAIN FIRST PARTY GEOLOCATION DATA INDICATING A GEOLOCATION OF A FIRST PARTY FROM A FIRST PARTY COMPUTING SYSTEM ASSOCIATED WITH THE FIRST PARTY OPERATION 303 from the first party computing system itself via one or more data links.

In various embodiments, the first party geolocation data is obtained and/or determined at OBTAIN FIRST PARTY GEOLOCATION DATA INDICATING A GEOLOCATION OF A FIRST PARTY FROM A FIRST PARTY COMPUTING SYSTEM ASSOCIATED WITH THE FIRST PARTY OPERATION 303 based on data from a WiFi connection used by the first party computing system.

In various embodiments, the first party geolocation data is obtained and/or determined at OBTAIN FIRST PARTY GEOLOCATION DATA INDICATING A GEOLOCATION OF A FIRST PARTY FROM A FIRST PARTY COMPUTING SYSTEM ASSOCIATED WITH THE FIRST PARTY OPERATION 303 based on data from a connection used by the first party computing system provided by "Bluetooth™".

In one embodiment, the first party geolocation data is obtained at OBTAIN FIRST PARTY GEOLOCATION DATA INDICATING A GEOLOCATION OF A FIRST PARTY FROM A FIRST PARTY COMPUTING SYSTEM ASSOCIATED WITH THE FIRST PARTY OPERATION 303 from a social media system used by the first party and social media "geotagging".

In one embodiment, the first party geolocation data is obtained at OBTAIN FIRST PARTY GEOLOCATION DATA INDICATING A GEOLOCATION OF A FIRST PARTY FROM A FIRST PARTY COMPUTING SYSTEM ASSOCIATED WITH THE FIRST PARTY OPERATION 303 from a social media system used by the first party and active posting on the social media system.

Herein, social media systems, social media websites, and social media networks, regardless of distribution and access means, are collectively referred to as "social media systems". Herein, social media systems include, but are not limited to, computing system implemented networks, systems, and sites that allow users to provide content, often in the form of posts, about themselves and to track and view posts from selected other users of the social media system.

Specific examples of currently available social media systems include social media systems such as, but not limited to, those offered through Facebook™; Twitter™; Linkedin™; Bebo™; Classmates.com™; Foursquare™; MySpace™; and many other post, blogging, and user content provided, websites/networks as discussed herein, and/or as known in the art at the time of filing, and/or as developed after the time of filing.

A popular feature associated with social media systems is the "user location update" feature whereby a user can inform their friends/follows of their location thru semi-automatically, or automatically, generated posts indicating the user's location and/or the business associated with that location. A specific illustrative example of a user location update feature is the "check-in" feature currently provided within the social media system offered by Facebook™.

The user location update feature has proven popular and useful not only to let a user's friends know where the user is located, but also to learn if the user's friends are nearby at the same time. One of the key attributes that has contributed to the popularity and usefulness of the user location update feature is the minimal user data input required and the semi-automatic, or automatic, aspect of the user location update feature that allows the user to post their location without the need to enter any text, or provide significant other user input.

In various embodiments, the first party geolocation data is determined and/or obtained at OBTAIN FIRST PARTY GEOLOCATION DATA INDICATING A GEOLOCATION OF A FIRST PARTY FROM A FIRST PARTY COMPUTING SYSTEM ASSOCIATED WITH THE FIRST PARTY OPERATION 303 by any method, means, mechanism, or procedure for determining a position of a computing system as discussed herein, and/or as known in the art at the time of filing, and/or as developed after the time of filing.

Numerous means, methods, systems, algorithms, procedures, and processes are known in the art for obtaining location data associated with a computing system. Consequently, a more detailed discussion of any particular means, method, system, algorithm, procedure, and/or process, for obtaining location data associated with a computing system is omitted here to avoid detracting from the invention.

In one embodiment, once first party geolocation data indicating a geolocation of a first party is obtained at OBTAIN FIRST PARTY GEOLOCATION DATA INDICATING A GEOLOCATION OF A FIRST PARTY FROM A FIRST PARTY COMPUTING SYSTEM ASSOCIATED WITH THE FIRST PARTY OPERATION 303, process flow proceeds to OBTAIN DATA INDICATING ONE OR MORE CONTACT PARTIES ASSOCIATED WITH THE FIRST PARTY OPERATION 305.

In one embodiment, at OBTAIN DATA INDICATING ONE OR MORE CONTACT PARTIES ASSOCIATED WITH THE FIRST PARTY OPERATION 305 data indicating one or more contact parties associated with the first party is obtained from one or more sources.

In one embodiment, data indicating one or more contact parties associated with the first party is obtained at OBTAIN DATA INDICATING ONE OR MORE CONTACT PARTIES ASSOCIATED WITH THE FIRST PARTY OPERATION 305 from a contacts list associated an application implemented by the first party computing system, such as, as a specific illustrative example, data from the "contacts" feature of the e-mail and personal organization application provided by "Outlook™" from Microsoft™.

In one embodiment, data indicating one or more contact parties associated with the first party is obtained at OBTAIN DATA INDICATING ONE OR MORE CONTACT PAR- TIES ASSOCIATED WITH THE FIRST PARTY OPERATION 305 from a social media system used by the first party and/or the contact parties associated with the first party.

As noted above, herein, social media systems, social media websites, and social media networks, regardless of distribution and access means, are collectively referred to as "social media systems". Herein, social media systems include, but are not limited to, computing system implemented networks, systems and sites that allow users to provide content, often in the form of posts, about themselves and to track and view posts from selected other users of the social media system.

Specific examples of currently available social media systems include social media systems such as, but not limited to, those offered through Facebook™; Twitter™; Linkedin™; Bebo™; Classmates.com™; Foursquare™; MySpace™; and many other post, blogging, and user content provided, websites/networks as discussed herein, and/or as known in the art at the time of filing, and/or as developed after the time of filing.

In various embodiments, the data indicating one or more contact parties associated with the first party is obtained at OBTAIN DATA INDICATING ONE OR MORE CONTACT PARTIES ASSOCIATED WITH THE FIRST PARTY OPERATION 305 from any source of data indicating one or more contact parties associated with the first party as discussed herein, and/or as known in the art at the time of filing, and/or as developed after the time of filing.

In one embodiment, once data indicating one or more contact parties associated with the first party is obtained from one or more sources at OBTAIN DATA INDICATING ONE OR MORE CONTACT PARTIES ASSOCIATED WITH THE FIRST PARTY OPERATION 305, process flow proceeds to DEFINE A RELEVANT CONTACT PARTY RADIUS OPERATION 307.

In one embodiment, at DEFINE A RELEVANT CONTACT PARTY RADIUS OPERATION 307 a relevant contact party radius is defined.

In one embodiment, the relevant contact party radius of DEFINE A RELEVANT CONTACT PARTY RADIUS OPERATION 307 represents a distance, such as a defined number of feet, yards, meters, etc., from the geolocation of the first party. In one embodiment, the relevant contact party radius is defined such that any contact parties of the one or more contact parties associated with the first party determined to be within the relevant contact party radius are considered potentially relevant contact parties with respect to the first party.

In one embodiment, once a relevant contact party radius is defined at DEFINE A RELEVANT CONTACT PARTY RADIUS OPERATION 307, process flow proceeds to OBTAIN CONTACT PARTY GEOLOCATION DATA OPERATION 309.

In one embodiment, at OBTAIN CONTACT PARTY GEOLOCATION DATA OPERATION 309 contact party geolocation data indicating the geolocation of at least one of the contact parties of the one or more contact parties associated with the first party is obtained.

In one embodiment, the contact party geolocation data is obtained at OBTAIN CONTACT PARTY GEOLOCATION DATA OPERATION 309 from various contact parties' computing systems associated with the contact parties, such as, but not limited to, data obtained via a Global Positioning Satellite (GPS) system and/or a GPS capability provided with the contact parties' computing systems.

In various embodiments, the contact party geolocation data is obtained and/or determined at OBTAIN CONTACT PARTY GEOLOCATION DATA OPERATION 309 based on analysis of a communication signal used and/or emitted by the contact parties' computing systems, such as, but not limited to, a contact party's mobile computing system and/or the relay stations used by a contact party's computing system.

In various embodiments, the contact party geolocation data is obtained at OBTAIN CONTACT PARTY GEOLOCATION DATA OPERATION 309 from the contact parties' computing systems themselves via one or more data links.

In various embodiments, the contact party geolocation data is obtained and/or determined at OBTAIN CONTACT PARTY GEOLOCATION DATA OPERATION 309 based on data from a WiFi connection used by the contact parties' computing systems.

In various embodiments, the contact party geolocation data is obtained and/or determined at OBTAIN CONTACT PARTY GEOLOCATION DATA OPERATION 309 based on data from a "Bluetooth™" connection used by the contact parties' computing systems.

In one embodiment, the contact party geolocation data is obtained at OBTAIN CONTACT PARTY GEOLOCATION DATA OPERATION 309 from a social media system used by the contact parties' and social media "geotagging".

In one embodiment, the contact party geolocation data is obtained at OBTAIN CONTACT PARTY GEOLOCATION DATA OPERATION 309 from a social media system used by the contact parties' and active posting on the social media system.

In one embodiment, once contact party geolocation data indicating the geolocation of at least one of the contact parties of the one or more contact parties associated with the first party is obtained at OBTAIN CONTACT PARTY GEOLOCATION DATA OPERATION 309, process flow proceeds to ANALYZE THE FIRST PARTY GEOLOCATION DATA AND THE CONTACT PARTY GEOLOCATION DATA OPERATION 311.

In one embodiment, at ANALYZE THE FIRST PARTY GEOLOCATION DATA AND THE CONTACT PARTY GEOLOCATION DATA OPERATION 311 the contact party geolocation data of OBTAIN CONTACT PARTY GEOLOCATION DATA OPERATION 309, the first party's geolocation data of OBTAIN FIRST PARTY GEOLOCATION DATA INDICATING A GEOLOCATION OF A FIRST PARTY FROM A FIRST PARTY COMPUTING SYSTEM ASSOCIATED WITH THE FIRST PARTY OPERATION 303, and data representing the relevant contact party radius of DEFINE A RELEVANT CONTACT PARTY RADIUS OPERATION 307 is analyzed using one or more processors associated with one or more computing systems to identify any relevant contact parties within the relevant contact party radius.

In one embodiment, once the contact party geolocation data of OBTAIN CONTACT PARTY GEOLOCATION DATA OPERATION 309, the first party's geolocation data of OBTAIN FIRST PARTY GEOLOCATION DATA INDICATING A GEOLOCATION OF A FIRST PARTY FROM A FIRST PARTY COMPUTING SYSTEM ASSOCIATED WITH THE FIRST PARTY OPERATION 303, and the relevant contact party radius data of DEFINE A RELEVANT CONTACT PARTY RADIUS OPERATION 307 is analyzed using one or more processors associated with one or more computing systems to identify any relevant contact parties within the relevant contact party radius at ANALYZE THE FIRST PARTY GEOLOCATION DATA AND THE CONTACT PARTY GEOLOCATION DATA OPERATION 311, process flow proceeds to IDENTIFY A CONTACT PARTY WITHIN THE RELEVANT CONTACT PARTY RADIUS OPERATION 313.

In one embodiment, at IDENTIFY A CONTACT PARTY WITHIN THE RELEVANT CONTACT PARTY RADIUS OPERATION 313, as a result of the analysis of the contact party geolocation data of OBTAIN CONTACT PARTY GEOLOCATION DATA OPERATION 309, the first party's geolocation data of OBTAIN FIRST PARTY GEOLOCATION DATA INDICATING A GEOLOCATION OF A FIRST PARTY FROM A FIRST PARTY COMPUTING SYSTEM ASSOCIATED WITH THE FIRST PARTY OPERATION 303, and the relevant contact party radius data of DEFINE A RELEVANT CONTACT PARTY RADIUS OPERATION 307 at ANALYZE THE FIRST PARTY GEOLOCATION DATA AND THE CONTACT PARTY GEOLOCATION DATA OPERATION 311, a contact party of OBTAIN DATA INDICATING ONE OR MORE CONTACT PARTIES ASSOCIATED WITH THE FIRST PARTY OPERATION 305 within the relevant contact party radius of DEFINE A RELEVANT CONTACT PARTY RADIUS OPERATION 307 is identified.

In one embodiment, once, a contact party of OBTAIN DATA INDICATING ONE OR MORE CONTACT PARTIES ASSOCIATED WITH THE FIRST PARTY OPERATION 305 within the relevant contact party radius of DEFINE A RELEVANT CONTACT PARTY RADIUS OPERATION 307 is identified at IDENTIFY A CONTACT PARTY WITHIN THE RELEVANT CONTACT PARTY RADIUS OPERATION 313, process flow proceeds to DESIGNATE THE CONTACT PARTY WITHIN THE RELEVANT CONTACT PARTY RADIUS A RELEVANT CONTACT PARTY OPERATION 315.

In one embodiment, at DESIGNATE THE CONTACT PARTY WITHIN THE RELEVANT CONTACT PARTY RADIUS A RELEVANT CONTACT PARTY OPERATION 315, the contact party identified as being within the relevant contact party radius of DEFINE A RELEVANT CONTACT PARTY RADIUS OPERATION 307 at IDENTIFY A CONTACT PARTY WITHIN THE RELEVANT CONTACT PARTY RADIUS OPERATION 313 is designated as a relevant contact party.

In one embodiment, at DESIGNATE THE CONTACT PARTY WITHIN THE RELEVANT CONTACT PARTY RADIUS A RELEVANT CONTACT PARTY OPERATION 315, the contact party identified as being within the relevant contact party radius of DEFINE A RELEVANT CONTACT PARTY RADIUS OPERATION 307 at IDENTIFY A CONTACT PARTY WITHIN THE RELEVANT CONTACT PARTY RADIUS OPERATION 313 is designated as a relevant contact party based on the contact party being within the relevant contact party radius.

In one embodiment, at DESIGNATE THE CONTACT PARTY WITHIN THE RELEVANT CONTACT PARTY RADIUS A RELEVANT CONTACT PARTY OPERATION 315, the contact party identified as being within the relevant contact party radius of DEFINE A RELEVANT CONTACT PARTY RADIUS OPERATION 307 at IDENTIFY A CONTACT PARTY WITHIN THE RELEVANT CONTACT PARTY RADIUS OPERATION 313 is designated as a relevant contact party not only based on the contact party being within the relevant contact party radius but also based on the first party's history of selecting the contact party as a relevant contact party.

In one embodiment, at DESIGNATE THE CONTACT PARTY WITHIN THE RELEVANT CONTACT PARTY RADIUS A RELEVANT CONTACT PARTY OPERATION 315, the contact party identified as being within the relevant contact party radius of DEFINE A RELEVANT CONTACT PARTY RADIUS OPERATION 307 at IDENTIFY A CONTACT PARTY WITHIN THE RELEVANT CONTACT PARTY RADIUS OPERATION 313 is designated as a relevant contact party not only based on the contact party being within the relevant contact party radius but also based on the first party's history of selecting the contact party as a relevant contact party within a specific application currently being accessed and/or implementing/using process 300 for identifying geolocationally relevant contacts and acquiring their contact data.

In one embodiment, once the contact party identified as being within the relevant contact party radius is designated as a relevant contact party at DESIGNATE THE CONTACT PARTY WITHIN THE RELEVANT CONTACT PARTY RADIUS A RELEVANT CONTACT PARTY OPERATION 315, process flow proceeds to OBTAIN CONTACT DATA FOR THE RELEVANT CONTACT PARTY OPERATION 317.

In one embodiment, at OBTAIN CONTACT DATA FOR THE RELEVANT CONTACT PARTY OPERATION 317 when a relevant contact party within the relevant contact party radius is designated at DESIGNATE THE CONTACT PARTY WITHIN THE RELEVANT CONTACT PARTY RADIUS A RELEVANT CONTACT PARTY OPERATION 315, contact data for the designated relevant contact party is obtained.

In various embodiments, the contact data for the designated relevant contact party of OBTAIN CONTACT DATA FOR THE RELEVANT CONTACT PARTY OPERATION 317 includes, but is not limited to, data representing, the relevant contact party's full name, the relevant contact party's e-mail address, the relevant contact party's phone number, the relevant contact party's account number, a webpage address associated with the relevant contact party, the relevant contact party's social media account and access data, and/or any other contact, or other data, associated with the relevant contact party.

In one embodiment, the contact data for the designated relevant contact party is obtained at OBTAIN CONTACT DATA FOR THE RELEVANT CONTACT PARTY OPERATION 317 from data already in the first party computing system, such as data contained in a contacts list of an application implemented on the first party computing system.

In one embodiment, the contact data for the designated relevant contact party is obtained at OBTAIN CONTACT DATA FOR THE RELEVANT CONTACT PARTY OPERATION 317 from a contact party computing system via a data link or a third party computing system.

In one embodiment, the contact data for the designated relevant contact party is obtained at OBTAIN CONTACT DATA FOR THE RELEVANT CONTACT PARTY OPERATION 317 from a social media system.

In one embodiment, the contact data for the designated relevant contact party is obtained at OBTAIN CONTACT DATA FOR THE RELEVANT CONTACT PARTY OPERATION 317 from any database.

In one embodiment, the contact data for the designated relevant contact party is obtained at OBTAIN CONTACT DATA FOR THE RELEVANT CONTACT PARTY OPERATION 317 from any source of contact data, as discussed herein, and/or as known in the art at the time of filing, and/or as developed after the time of filing.

In one embodiment, once contact data for the designated relevant contact party is obtained at OBTAIN CONTACT DATA FOR THE RELEVANT CONTACT PARTY OPERATION 317, process flow proceeds to PROVIDE THE CONTACT DATA FOR THE RELEVANT CONTACT PARTY TO ONE OR MORE APPLICATIONS ASSOCIATED WITH THE FIRST PARTY COMPUTING SYSTEM OPERATION 319.

In one embodiment, at PROVIDE THE CONTACT DATA FOR THE RELEVANT CONTACT PARTY TO ONE OR MORE APPLICATIONS ASSOCIATED WITH THE FIRST PARTY COMPUTING SYSTEM OPERATION 319 the contact data for the designated relevant contact party of OBTAIN CONTACT DATA FOR THE RELEVANT CONTACT PARTY OPERATION 317 is provided to one or more applications associated with the first party computing system.

In one embodiment, at PROVIDE THE CONTACT DATA FOR THE RELEVANT CONTACT PARTY TO ONE OR MORE APPLICATIONS ASSOCIATED WITH THE FIRST PARTY COMPUTING SYSTEM OPERATION 319 the contact data for the designated relevant contact party of OBTAIN CONTACT DATA FOR THE RELEVANT CONTACT PARTY OPERATION 317 is provided to one or more Point-to-Point data transfer applications such as, but not limited to, a Point-to-Point payment application; a Point-to-Point image data transfer application; a Point-to-Point video data transfer application; a Point-to-Point audio data transfer application; a Point-to-Point text data transfer application; a Point-to-Point webpage data transfer application; and/or any other Point-to-Point data transfer application as discussed herein, and/or as known in the art at the time of filing, and/or as developed after the time of filing.

In one embodiment, the contact data for the identified relevant contact party provided to the one or more applications associated with the first party computing system at PROVIDE THE CONTACT DATA FOR THE RELEVANT CONTACT PARTY TO ONE OR MORE APPLICATIONS ASSOCIATED WITH THE FIRST PARTY COMPUTING SYSTEM OPERATION 319 is used to "auto-fill" one or more data fields in the one or more applications, thereby reducing required data input.

In one embodiment, once the contact data for the designated relevant contact party of OBTAIN CONTACT DATA FOR THE RELEVANT CONTACT PARTY OPERATION 317 is provided to one or more applications associated with the first party computing system, at PROVIDE THE CONTACT DATA FOR THE RELEVANT CONTACT PARTY TO ONE OR MORE APPLICATIONS ASSOCIATED WITH THE FIRST PARTY COMPUTING SYSTEM OPERATION 319, process flow proceeds to EXIT OPERATION 330.

In one embodiment, at EXIT OPERATION 330, process 300 for identifying geolocationally relevant contacts and acquiring their contact data is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process 300 for identifying geolocationally relevant contacts and acquiring their contact data, a first party's geolocation is determined and a second, or relevant, contact party is identified based on the their proximity to the first party. The contact data for the identified relevant contact party is then obtained and provided to an application used by the first party without any significant first party data entry. Consequently using process 300 for identifying geolocationally relevant contacts and acquiring their contact data, applications automatically identify relevant contact parties and automatically obtain the relevant contact parties' identification and contact data.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "alerting", "applying", "analyzing", "assigning", "associating", "calculating", "capturing", "categorizing", "classifying", "comparing", "creating", "defining", "designating", "detecting", "determining", "displaying", "distributing", "encrypting", "extracting", "filtering", "forwarding", "generating", "grouping", "identifying", "implementing", "informing", "monitoring", "obtaining", "posting", "processing", "providing", "receiving", "requesting", "saving", "selecting", "sending", "storing", "transferring", "transforming", "transmitting", "using", etc., refer to the action and process of a computing system or similar electronic device that manipulates and operates on data represented as physical (electronic)

quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

The Abstract of the Disclosure is provided to comply with 37 C.F.R., section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computing system implemented method for identifying geolocationally relevant contacts and acquiring their contact data comprising the following, which when executed individually or collectively by any set of one or more processors perform a process including:
   obtaining first party geolocation data indicating a geolocation of a first party from a first party computing system associated with the first party, wherein the first party geolocation data is obtained from a communication signal used and/or emitted by the first party computing system;
   obtaining data indicating one or more contact parties associated with the first party;
   defining a relevant contact party radius representing a distance from the geolocation of the first party such that contact parties associated with the first party within the relevant contact party radius are considered relevant contact parties with respect to the first party;
   obtaining contact party geolocation data indicating the geolocation of at least one of the contact parties associated with the first party;
   analyzing the first party geolocation data and the contact party geolocation data and identifying a relevant contact party within the relevant contact party radius;
   obtaining contact data for the identified relevant contact party; and
   providing the contact data for the identified relevant contact party to one or more applications associated with the first party computing system.

2. The computing system implemented method for identifying geolocationally relevant contacts and acquiring their contact data of claim 1 wherein the first party computing system is a mobile computing system.

3. The computing system implemented method for identifying geolocationally relevant contacts and acquiring their contact data of claim 1 wherein the first party computing system is a mobile phone.

4. The computing system implemented method for identifying geolocationally relevant contacts and acquiring their contact data of claim 1 wherein the geolocation data indicating the geolocation of the first party is obtained from one or more sources of geolocation data selected from the group of sources of geolocation data consisting of:
   Global Positioning System (GPS) data associated with the first party computing system;
   a communication signal used and/or emitted by relay stations used by the first party computing system;
   one or more data links used by the first party computing system;
   a WiFi system used by the first party computing system;
   data from a social media network and/or system used by the first party;
   data provided by the first party;
   or any combination thereof.

5. The computing system implemented method for identifying geolocationally relevant contacts and acquiring their contact data of claim 1 wherein the data indicating contact parties associated with the first party is obtained from a contacts list of an application implemented by the first party computing system.

6. The computing system implemented method for identifying geolocationally relevant contacts and acquiring their contact data of claim 1 wherein the data indicating contact parties associated with the first party is obtained from a social media system used by the first party.

7. The computing system implemented method for identifying geolocationally relevant contacts and acquiring their contact data of claim 1 wherein the contact party geolocation data is obtained from one or more sources of geolocation data selected from the group of sources of geolocation data consisting of:
   Global Positioning System (GPS) data associated with one or more contact party computing systems associated with the contact parties;
   a communication signal used and/or emitted by one or more contact party computing systems associated with the contact parties;
   a communication signal used and/or emitted by relay stations used by one or more contact party computing systems associated with the contact parties;
   one or more data links used by one or more contact party computing systems associated with the contact parties;
   a WiFi system used by one or more contact party computing systems associated with the contact parties;
   data from a social media network and/or system used by the contact parties;
   data provided by the contact parties;
   or any combination thereof.

8. The computing system implemented method for identifying geolocationally relevant contacts and acquiring their contact data of claim 1 wherein the contact data for the identified relevant contact party is obtained from a contacts list of an application implemented by the first party computing system.

9. The computing system implemented method for identifying geolocationally relevant contacts and acquiring their contact data of claim 1 wherein the contact data for the identified relevant contact party is obtained from a social media system used by the first party.

10. The computing system implemented method for identifying geolocationally relevant contacts and acquiring their contact data of claim 1 wherein the contact data for the identified relevant contact party is obtained from a social media system used by the identified relevant contact party.

11. The computing system implemented method for identifying geolocationally relevant contacts and acquiring their contact data of claim 1 wherein the contact data for the identified relevant contact party is obtained from a relevant contact party computing system associated with the identified relevant contact party.

12. The computing system implemented method for identifying geolocationally relevant contacts and acquiring their contact data of claim 1 wherein the contact data for the identified relevant contact party is provided to a Point-to-Point (P2P) application associated with the first party computing system.

13. The computing system implemented method for identifying geolocationally relevant contacts and acquiring their contact data of claim 12 wherein the Point-to-Point application associated with the first party computing system is selected from the group of Point-to-Point applications consisting of:
   a Point-to-Point payment application;
   a Point-to-Point image data transfer application;
   a Point-to-Point video data transfer application;
   a Point-to-Point audio data transfer application;
   a Point-to-Point text data transfer application;
   a Point-to-Point webpage data transfer application;
   or any combination thereof.

14. A computer program product for identifying geolocationally relevant contacts and acquiring their contact data comprising:
   a nontransitory computer readable medium;
   and computer program code, encoded on the computer readable medium, comprising computer readable instructions which, when executed via any set of one or more processors, perform the following:
   obtaining first party geolocation data indicating a geolocation of a first party from a first party computing system associated with the first party, wherein the first party geolocation data is obtained from a communication signal used and/or emitted by the first party computing system;
   obtaining data indicating one or more contact parties associated with the first party;
   defining a relevant contact party radius representing a distance from the geolocation of the first party such that contact parties associated with the first party within the relevant contact party radius are considered relevant contact parties with respect to the first party;
   obtaining contact party geolocation data indicating the geolocation of at least one of the contact parties associated with the first party;
   analyzing the first party geolocation data and the contact party geolocation data and identifying a relevant contact party within the relevant contact party radius;
   obtaining contact data for the identified relevant contact party; and
   providing the contact data for the identified relevant contact party to one or more applications associated with the first party computing system.

15. The computer program product for identifying geolocationally relevant contacts and acquiring their contact data of claim 14 wherein the first party computing system is a mobile computing system.

16. The computer program product for identifying geolocationally relevant contacts and acquiring their contact data of claim 14 wherein the first party computing system is a mobile phone.

17. The computer program product for identifying geolocationally relevant contacts and acquiring their contact data of claim 14 wherein the geolocation data indicating the geolocation of the first party is obtained from one or more sources of geolocation data selected from the group of sources of geolocation data consisting of:
   Global Positioning System (GPS) data associated with the first party computing system;
   a communication signal used and/or emitted by relay stations used by the first party computing system;
   one or more data links used by the first party computing system;
   a WiFi system used by the first party computing system;
   data from a social media network and/or system used by the first party;
   data provided by the first party;
   or any combination thereof.

18. The computer program product for identifying geolocationally relevant contacts and acquiring their contact data of claim 14 wherein the data indicating contact parties associated with the first party is obtained from a contacts list of an application implemented by the first party computing system.

19. The computer program product for identifying geolocationally relevant contacts and acquiring their contact data of claim 14 wherein the data indicating contact parties associated with the first party is obtained from a social media system used by the first party.

20. The computer program product for identifying geolocationally relevant contacts and acquiring their contact data of claim 14 wherein the contact party geolocation data is obtained from one or more sources of geolocation data selected from the group of sources of geolocation data consisting of:
  Global Positioning System (GPS) data associated with one or more contact party computing systems associated with the contact parties;
  a communication signal used and/or emitted by one or more contact party computing systems associated with the contact parties;
  a communication signal used and/or emitted by relay stations used by one or more contact party computing systems associated with the contact parties;
  one or more data links used by one or more contact party computing systems associated with the contact parties;
  a WiFi system used by one or more contact party computing systems associated with the contact parties;
  data from a social media network and/or system used by the contact parties;
  data provided by the contact parties;
  or any combination thereof.

21. The computer program product for identifying geolocationally relevant contacts and acquiring their contact data of claim 14 wherein the contact data for the identified relevant contact party is obtained from a contacts list of an application implemented by the first party computing system.

22. The computer program product for identifying geolocationally relevant contacts and acquiring their contact data of claim 14 wherein the contact data for the identified relevant contact party is obtained from a social media system used by the first party.

23. The computer program product for identifying geolocationally relevant contacts and acquiring their contact data of claim 14 wherein the contact data for the identified relevant contact party is obtained from a social media system used by the identified relevant contact party.

24. The computer program product for identifying geolocationally relevant contacts and acquiring their contact data of claim 14 wherein the contact data for the identified relevant contact party is obtained from a relevant contact party computing system associated with the identified relevant contact party.

25. The computer program product for identifying geolocationally relevant contacts and acquiring their contact data of claim 14 wherein the contact data for the identified relevant contact party is provided to a Point-to-Point (P2P) application associated with the first party computing system.

26. The computer program product for identifying geolocationally relevant contacts and acquiring their contact data of claim 25 wherein the Point-to-Point application associated with the first party computing system is selected from the group of Point-to-Point applications consisting of:
  a Point-to-Point payment application;
  a Point-to-Point image data transfer application;
  a Point-to-Point video data transfer application;
  a Point-to-Point audio data transfer application;
  a Point-to-Point text data transfer application;
  a Point-to-Point webpage data transfer application;
  or any combination thereof.

27. A system for identifying geolocationally relevant contacts and acquiring their contact data comprising:
  at least one processor; and
  at least one memory coupled to the at least one processor, the at least one memory having stored therein instructions which when executed by any set of the one or more processors, perform a process for identifying geolocationally relevant contacts and acquiring their contact data, the process for identifying geolocationally relevant contacts and acquiring their contact data including:
    obtaining first party geolocation data indicating a geolocation of a first party from a first party computing system associated with the first party, wherein the first party geolocation data is obtained from a communication signal used and/or emitted by the first party computing system;
    obtaining data indicating one or more contact parties associated with the first party;
    defining a relevant contact party radius representing a distance from the geolocation of the first party such that contact parties associated with the first party within the relevant contact party radius are considered relevant contact parties with respect to the first party;
    obtaining contact party geolocation data indicating the geolocation of at least one of the contact parties associated with the first party;
    analyzing the first party geolocation data and the contact party geolocation data and identifying a relevant contact party within the relevant contact party radius;
    obtaining contact data for the identified relevant contact party; and
    providing the contact data for the identified relevant contact party to one or more applications associated with the first party computing system.

28. The system for identifying geolocationally relevant contacts and acquiring their contact data of claim 27 wherein the first party computing system is a mobile computing system.

29. The system for identifying geolocationally relevant contacts and acquiring their contact data of claim 27 wherein the first party computing system is a mobile phone.

30. The system for identifying geolocationally relevant contacts and acquiring their contact data of claim 27 wherein the geolocation data indicating the geolocation of the first party is obtained from one or more sources of geolocation data selected from the group of sources of geolocation data consisting of:
  Global Positioning System (GPS) data associated with the first party computing system;
  a communication signal used and/or emitted by relay stations used by the first party computing system;
  one or more data links used by the first party computing system;
  a WiFi system used by the first party computing system;
  data from a social media network and/or system used by the first party;
  data provided by the first party;
  or any combination thereof.

31. The system for identifying geolocationally relevant contacts and acquiring their contact data of claim 27 wherein the data indicating contact parties associated with the first party is obtained from a contacts list of an application implemented by the first party computing system.

32. The system for identifying geolocationally relevant contacts and acquiring their contact data of claim 27 wherein the data indicating contact parties associated with the first party is obtained from a social media system used by the first party.

33. The system for identifying geolocationally relevant contacts and acquiring their contact data of claim 27 wherein the contact party geolocation data is obtained from one or more sources of geolocation data selected from the group of sources of geolocation data consisting of:

Global Positioning System (GPS) data associated with one or more contact party computing systems associated with the contact parties;
a communication signal used and/or emitted by one or more contact party computing systems associated with the contact parties;
a communication signal used and/or emitted by relay stations used by one or more contact party computing systems associated with the contact parties;
one or more data links used by one or more contact party computing systems associated with the contact parties;
a WiFi system used by one or more contact party computing systems associated with the contact parties;
data from a social media network and/or system used by the contact parties;
data provided by the contact parties;
or any combination thereof.

34. The system for identifying geolocationally relevant contacts and acquiring their contact data of claim 27 wherein the contact data for the identified relevant contact party is obtained from a contacts list of an application implemented by the first party computing system.

35. The system for identifying geolocationally relevant contacts and acquiring their contact data of claim 27 wherein the contact data for the identified relevant contact party is obtained from a social media system used by the first party.

36. The system for identifying geolocationally relevant contacts and acquiring their contact data of claim 27 wherein the contact data for the identified relevant contact party is obtained from a social media system used by the identified relevant contact party.

37. The system for identifying geolocationally relevant contacts and acquiring their contact data of claim 27 wherein the contact data for the identified relevant contact party is obtained from a relevant contact party computing system associated with the identified relevant contact party.

38. The system for identifying geolocationally relevant contacts and acquiring their contact data of claim 27 wherein the contact data for the identified relevant contact party is provided to a Point-to-Point (P2P) application associated with the first party computing system.

39. The system for identifying geolocationally relevant contacts and acquiring their contact data of claim 38 wherein the Point-to-Point application associated with the first party computing system is selected from the group of Point-to-Point applications consisting of:
a Point-to-Point payment application;
a Point-to-Point image data transfer application;
a Point-to-Point video data transfer application;
a Point-to-Point audio data transfer application;
a Point-to-Point text data transfer application;
a Point-to-Point webpage data transfer application;
or any combination thereof.

* * * * *